(12) United States Patent
Nethi et al.

(10) Patent No.: US 7,937,392 B1
(45) Date of Patent: May 3, 2011

(54) CLASSIFYING UNIFORM RESOURCE IDENTIFIER (URI) USING XPATH EXPRESSIONS

(75) Inventors: Ramesh Nethi, Bangalore (IN); Kousik Nandy, Bangalore (IN)

(73) Assignee: Sonoa Networks India (PVT) Ltd., Bangalore (IN)

( * ) Notice: Subject to any disclaimer, the term of this patent is extended or adjusted under 35 U.S.C. 154(b) by 421 days.

(21) Appl. No.: 12/058,925

(22) Filed: Mar. 31, 2008

(51) Int. Cl.
*G06F 7/00* (2006.01)
*G06F 17/00* (2006.01)
(52) U.S. Cl. ........................................ 707/737; 707/740
(58) Field of Classification Search .................. None
See application file for complete search history.

(56) References Cited

U.S. PATENT DOCUMENTS

| | | | |
|---|---|---|---|
| 6,990,632 B2* | 1/2006 | Rothchiller et al. .......... | 715/212 |
| 7,359,910 B2* | 4/2008 | Wu et al. ............................... | 1/1 |
| 7,409,400 B2* | 8/2008 | Ramarao ............................... | 1/1 |
| 7,467,157 B1* | 12/2008 | Chen et al. ............................ | 1/1 |
| 7,475,090 B2* | 1/2009 | Gheorghioiu et al. ................ | 1/1 |
| 2008/0040657 A1* | 2/2008 | Kuznetsov et al. ............ | 715/234 |

OTHER PUBLICATIONS

Reference U: "Internet Protocols" CSC/ECE 573, Fall, 2005 N.C. State University for TCP /IP 5-tuple connection, p. 3.*

* cited by examiner

*Primary Examiner* — Etienne P LeRoux
*Assistant Examiner* — Susan Y Chen
(74) *Attorney, Agent, or Firm* — Kanika Radhakrishnan; Evergreen Valley Law Group, P.C.

(57) ABSTRACT

Classifying Uniform Resource Identifier (URI) expression using one or more XPath expressions. A request comprising a URI expression and additional network information is modeled as a logical XML document representation. One or more XPath expressions are then created from the schema of the logical XML document. Each of the one or more XPath expressions represents a classification category of the request. Further, an XML document is generated from an incoming request. One or more XPath expressions are evaluated on the XML document for classifying the incoming request.

18 Claims, 4 Drawing Sheets

CLASSIFYING UNIFORM RESOURCE IDENTIFIER (URI) USING XPATH EXPRESSIONS

BACKGROUND

1. Technical Field

Embodiments of the invention relate generally to information processing and more particularly to classifying requests.

2. Prior Art

Information processing in network applications involves receiving requests and classifying them into different categories. Classification details are then used to take various actions including policy enforcement, access control, statistics collection and aggregation. A request from a user may include a Uniform Resource Identifier (URI) expression. URI expression is a uniform syntax of string of characters used to identify a resource. This identification enables interaction with representations of the resource over the network using specific protocols. URI expressions are defined in schemes defining a specific syntax and associated protocols. A URI expression may be classified as a Uniform Resource locator (URL) or a Uniform Resource Name (URN) or both. The complete address of a resource or files including the protocol, the domain and the name of the file constitute the URL. Persistent and location-independent resource identifiers constitute the URN.

URI expressions are de-referenced by clients or users as requests to retrieve a representation of resource which is identified by the URI expression. A request from a user includes the URI expression, and a collection of transport parameters. A repository of such URI expressions act as a server, which examines the URI expression and other transport parameters of the requested resource and provides the resource as a response. Often a server is designed to serve multiple resources, and it is necessary for the server to identify the correct representation of the resource based on the URI expression and other transport parameters of the request. URI classification is helpful for the server to identify the correct representation of the resource.

Further, URI classification is necessary to expedite the information retrieval by referencing the URI expressions of resources. The URI classification helps to support a given public namespace under URI allocation. URI classification also facilitates the representation of the public namespaces within the URI allocation. An URI expression may be represented as, "http://.example.com/abc/URI#Examples_of_URI_references". In the request, "http" identifies transport scheme, "example.com" is the host part or domain name, "/abc/URI" a path pointing to the resource or article, and "#Examples_of_URI_references" is a fragment pointing to specific parts of the resource or article.

A conventional method for URI classification is pattern matching with URI strings and other request parameters in the URI expression. Pattern matching matches the URI strings for the presence of the constituents of a given pattern. Pattern matching is used to check for a desired structure, to find relevant structure, and to retrieve the aligning parts. Pattern matching can be optimized in several ways, for example, partial string matching and regular expression matching. Further, a unique number representation (hash) of URI strings can be used to categorize the URI expressions. Various algorithms are known for translating pattern matching into conditional expressions.

However, pattern matching approach becomes inefficient in terms of flexible URI classification. The inefficiency arises because of the fact that the pattern based classifications can not take advantage of structure of URI syntax. Further, in pattern matching approach, inefficient regular expressions are used to match different sub-patterns simultaneously. A sub-pattern match is matching of the patterns between different systems. Moreover, there can be additional information available in addition to URI request, for example, additional information supplied by user as a part of request (typically a transport header, user's name, and user's id) which is not favorable for URI classification in pattern matching approach.

In light of the foregoing discussions, there is a need for a flexible and efficient solution for matching arbitrary complicated patterns in URI syntax. Further, the scope of classification to enable consideration of additional information has to be extended.

SUMMARY

Embodiments of the invention described herein provide methods, system and machine-readable medium product for classifying requests using XPath expressions. In an embodiment of the invention, an incoming request includes a uniform resource identifier (URI) expression. In another embodiment of the invention, the incoming request includes a URI expression and additional network information.

An exemplary embodiment of the invention provides a method for classifying a request using XPath expressions. A request comprising a URI expression and additional network information is modeled as a logical XML document representation. One or more XPath expressions, each representing one classification category of the request are created and stored. The XPath expressions are created from a schema of the logical XML document. Upon creating one or more XPath expressions, an XML document is generated from an incoming request. Further, one or more XPath expressions are evaluated on the XML document for classifying the incoming request.

An exemplary embodiment of the invention provides a system for classifying a request using one or more XPath expressions. The system includes an XML document model comprising a logical XML document representation of a request. The request comprises of a URI expression and additional network information. The system also includes an XPath expression creator for creating one or more XPath expressions representing a classification category of the request from a schema of the logical XML document. An XML document generator is provided for generating an XML document from an incoming request. Further the system includes an XPath processor for evaluating the XML document with one or more XPath expressions to classify the incoming request.

An exemplary embodiment of the invention provides a machine-readable medium product for classifying requests using XPath expressions. The machine-readable medium product includes instructions operable to cause a programmable processor to perform modeling a request comprising of a URI expression and additional network information as a logical XML document representation; creating one or more XPath expressions from a schema of the logical XML document representation, each of the one or more XPath expressions representing a classification category of the request; generating an XML document from an incoming request; and evaluating the one or more XPath expressions on the XML document for classifying the incoming request.

Other aspects and example embodiments are provided in the Figures and the Detailed Description that follows.

DETAILED DESCRIPTION OF THE EMBODIMENTS

Embodiments of the invention described herein provide methods, system and machine-readable medium product for classifying requests using one or more XPath expressions. In an embodiment of the invention, an incoming request includes a URI expression. In another embodiment of the invention, an incoming request includes a URI expression and additional network information. In another embodiment of the invention, an incoming request includes one or more of a URI expression, a uniform resource locator (URL) and a uniform resource name (URN). Various embodiments of the invention enable to classify an incoming request using one or more XPath expressions. In an embodiment of the invention, a request (including URI and additional network information) is modeled as an XML document. Based on the schema of this XML document, one or more XPath expressions may be created at configuration stage and may be stored in a server. These XPath expressions are used for representing the classification category of the request which may be provided by the user in future.

Once the incoming request is received from the user, the incoming request is converted to an XML document at runtime. Thereafter, one or more XPath expressions are evaluated on the XML document to classify the incoming request. The classified incoming request is then processed as per user requirement. In an embodiment of the invention, one or more XPath expressions are evaluated on a single incoming request to classify the incoming request. In another embodiment of the invention, one or more XPath expressions are evaluated on a set of incoming requests to classify the set of incoming requests. Various embodiments of the invention have been explained using an example of classifying one incoming request.

Figure 1:
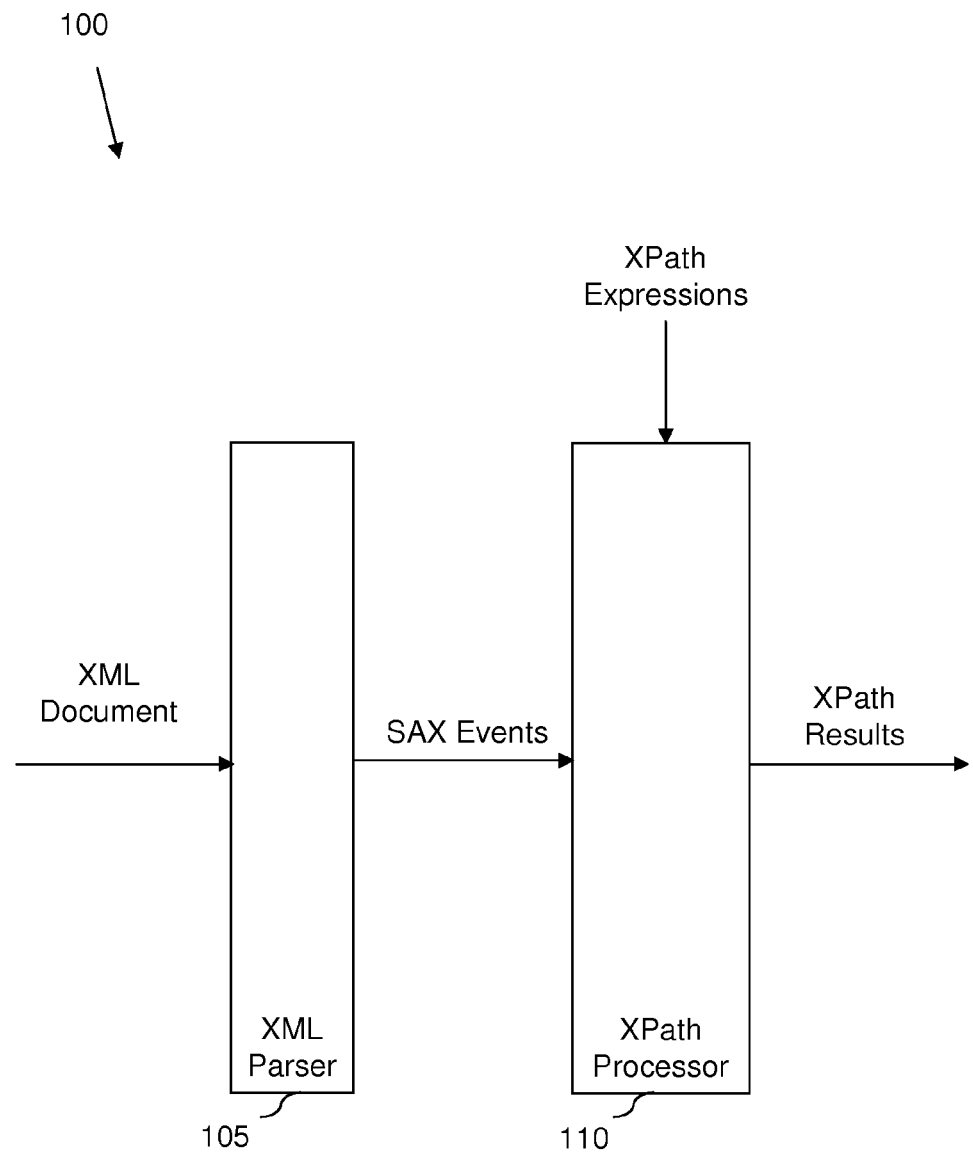
FIG. 1 is a block diagram of an environment in which various embodiments of the invention may be practiced.

FIG. 1 is a block diagram of an environment 100 in which various embodiments of the invention may be practiced. Environment 100 includes an XML parser 105 and an XPath processor 110. XML parser 105 receives several online streams of XML documents. In an embodiment of the invention, the incoming request is converted to an XML document. The method of converting the incoming request (URI expression) to an XML document is described in FIG. 2. The converted XML document is then fed into the XML parser 105. XML parser 105 may include an application program interface (API), for example, Simple API XML (SAX), for parsing XML documents. XML parser 105 parses an XML document to create SAX events. A SAX event may include XML text nodes, XML element nodes, XML processing instructions, XML comments, and a sequence of SAX events. XPath processor 110 subscribes to SAX events from XML parser 105.

XPath processor 110 receives the SAX events. XPath processor 110 also receives one or more XPath expressions. XPath is an expression language used for addressing XML messages and provides basic facilities for manipulating strings, numbers and Booleans. XPath operates on logical structure of XML messages. One or more XPath expressions search and extract information from any part of the XML document, for example, an element or attribute, in the XML document. One or more XPath expressions are configured at the compile time of the XML processing system shown as environment 100 in FIG. 1. For configuration, a pattern of URI expression (incoming request) is analyzed for the most common patterns. One or more XPath expressions are then configured to match the most common patterns. Patterns may include one or more of strings, queries and a combination of the above. One or more XPath expressions are thus able to match the pattern of any future incoming request. The method of creating one or more XPath expressions from URI expressions according to an embodiment of the invention is described in FIG. 2. In an embodiment of the invention, the XPath processor 110 can process one or more XPath expressions on an XML document. The XPath processor 110 evaluates one or more XPath expressions and generates corresponding XPath results.

Figure 2:
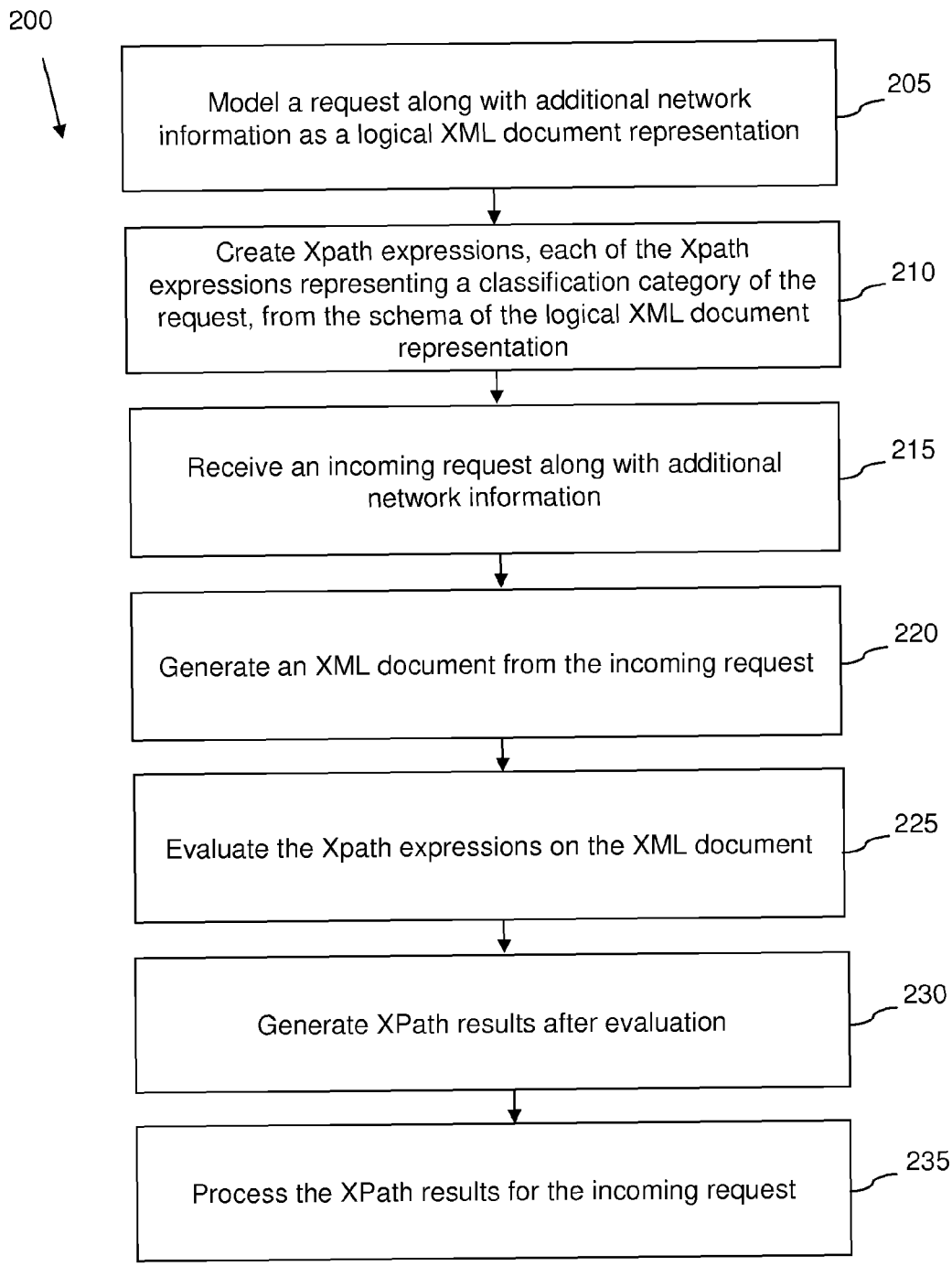
FIG. 2 is a flow diagram illustrating a method for classifying an incoming request in accordance with an embodiment of the invention.

FIG. 2 is a flow diagram illustrating a method 200 for classifying an incoming request in accordance with an embodiment of the invention.

At step 205, a request along with additional network information is modeled as a logical XML document representation. In an embodiment of the invention, a request includes a URI expression. Embodiments of the invention have been explained using a URI expression as an example of the request. In another embodiment of the invention, a request includes a URI expression and additional network information. The additional network information includes one or more of transport headers (For example, Hyper Text Transfer Protocol (HTTP) headers), Transmission Control Protocol (TCP) 5-tuple information (source IP address, source port, destination IP address, destination port and protocol information), and any other user supplied information as arbitrary name value pairs. The request, along with aforementioned components, is modeled as an XML document. Based on the schema of this XML document, one or more XPath expressions are created that correspond to classification categories at step 210. These XPath expressions are created and configured at configuration stage. Thus, one or more XPath expressions are available for evaluating against the incoming request.

An example of creating an XPath expression is explained as follows. For each URI expression, an XPath expression is created. The component separators of URI expression may be used as XPath's path separator while creating the XPath expression. For example, for a URI expression http://www.example.com, the corresponding XPath expression created may be /http/www/example/com. When some component separator of the URI expression is ignored, a star (*) symbol may be used corresponding to the number of ignored components. As an example: to match URI expression http://*.example.com, the corresponding XPath expression will be /http/*/example/com. When unspecified numbers of components are ignored, a zero length string may be used while creating corresponding XPath expression. For example, in a URI expression http://www.example.*/service, the star (*)

symbol could mean any number of domain components. The corresponding XPath expression in such a case may be /http/www/example//service.

In an embodiment of the invention, when additional network information needs to be considered along with the URI expression, XPath expression may be appended with a representation of the additional information using a clause separator, for example an 'and' clause. For example, for an HTTP header "SOAPAction: service", "and /SOAPAction [.='service']" may be added to the XPath expression. Thereafter, the XPath expression may be encapsulated by a root element, for example "/discriminator" and classification information may be stored against the URI expression. Once one or more XPath expressions are configured, an XML document representing the URI expression may be evaluated against one or more XPath expressions.

Upon configuration, at step 215, an incoming request along with additional network information is received. In an embodiment of the invention, an incoming request includes a URI expression. Embodiments of the invention have been explained using a URI expression as an example of the incoming request. In another embodiment of the invention, an incoming request includes a URI expression and additional network information. The additional network information includes one or more of transport headers (For example, Hyper Text Transfer Protocol (HTTP) headers), Transmission Control Protocol (TCP) 5-tuple information (source IP address, source port, destination IP address, destination port and protocol information), and any other user supplied information as arbitrary name value pairs.

Further, an XML document is generated from the incoming request (URI expression) at step 220. In an embodiment of the invention, an optimized in-memory representation of the XML infoset is generated. The XML document is generated from the URI expression automatically at run-time. In an embodiment of the invention, the XML document is generated from the URI expression by creating a root element and a child element. Once created, the root element and child element are named by a desired keyword respectively. Further, for each component of the URI expression, a child element is created from the last added element. For an exemplary URI expression, "http://www.example.com", representative XML document fragment may be represented as <http><www><example><com></com></example></www></http>.

If additional network information is available, for example an HTTP header, additional child elements of the parent element may be created. For creating the additional child elements, initially a child element is created with a header and a text element is created with a value. For example, if the additional information available includes "SOAPAction: service", XML document may be represented as <SOAPAction>service</SOAPAction>. So, for a URI expression "http://www.example.com" with additional network information of the HTTP header "SOAPAction: service", the XML document maybe represented as follows:

```
<discriminator>
    <http>
        <www>
            <example>
                <com>
                </com>
            </example>
        </www>
    </http>
```

```
    <SOAPAction>
        service
    </SOAPAction>
</discriminator>
```

Further, at step 225, the incoming request represented by an URI expression is classified by evaluating one or more XPath expressions on the XML document. One or more XPath expressions are run simultaneously on the XML document. Based on the matching of one or more XPath expressions, the URI expression is classified. For classifying the URI expression, the generated XML document from the URI expression is provided as input to an XPath processor 110. The XPath processor 110 is pre-configured with one or more XPath expressions created at step 210. Evaluating XPath expressions is explained further in conjunction with FIG. 3.

Upon evaluating the one or more XPath expressions, classification information stored for the XPath results are generated at step 230. For example, if an XML document prepared from incoming request matches an XPath expression '1', then the incoming request belongs to a category 'A'. If an XML document prepared from incoming request matches another XPath expression '2', then the incoming request belongs to category 'B'. Further, at step 235, the XPath results generated for the one or more XPath expressions are processed. At processing the XPath results are outputted to the users as per the requirement.

Figure 3:
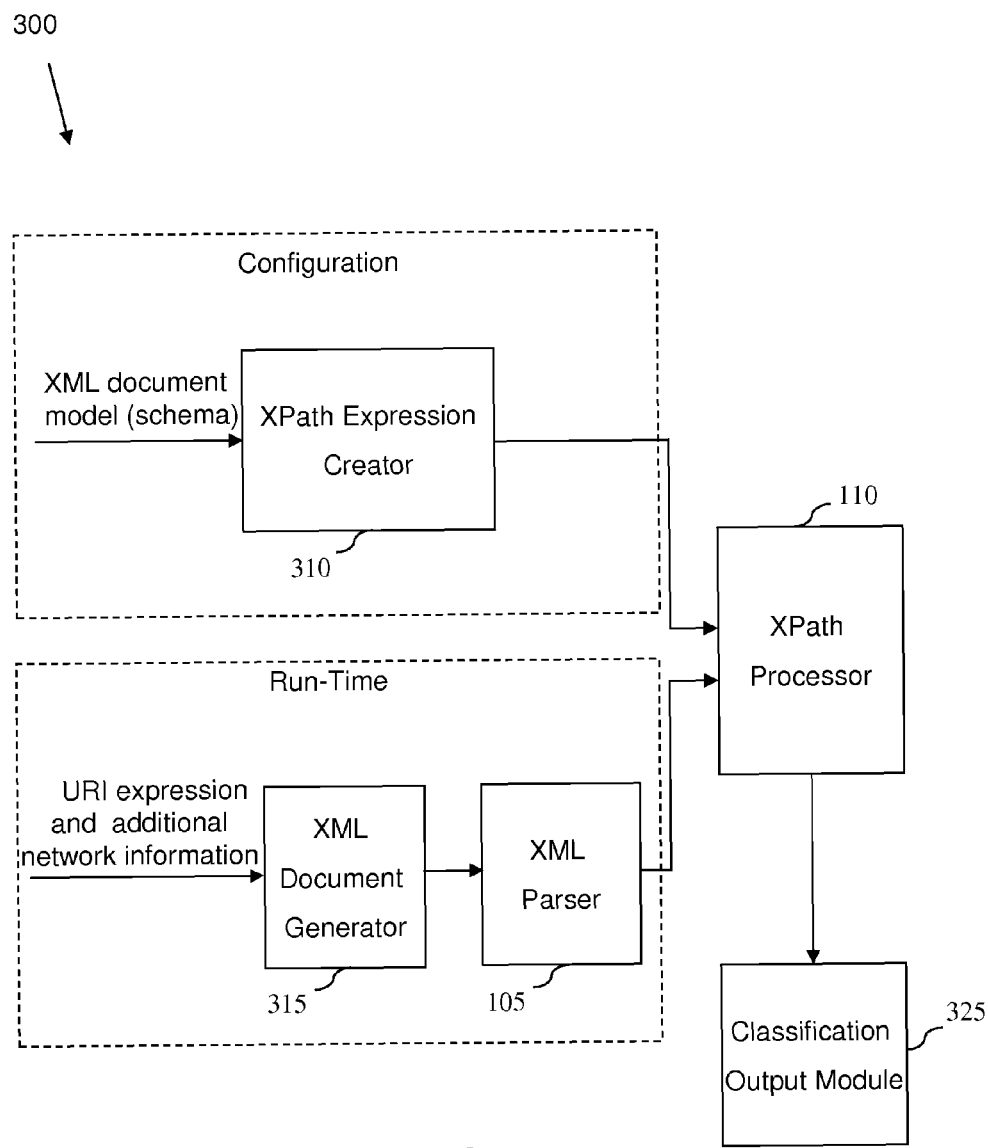
FIG. 3 is a block diagram illustrating an exemplary implementation of a system according to an embodiment of the invention.

FIG. 3 is a block diagram illustrating an exemplary implementation of a system 300 according to an embodiment of the invention. The system includes an XPath expression creator 310, an XML document generator 315, an XML parser 105, an XPath processor 110 and a classification output module 325.

Various patterns of URI expressions are analyzed for a pre-determined period to arrive at the most common patterns. Patterns may include one or more of strings, queries and a combination of the above. Based on the analysis a common pattern is analyzed for the URI expressions and thus the URI expressions (requests) are modeled. The URI expressions are modeled as an XML document model (schema) comprising a logical XML document representation of the URI expressions. The XML document model (schema) is further provided to the XPath expression creator 310.

Further, one or more XPath expressions corresponding to the URI expressions are created using the XPath expression creator 310. In an embodiment of the invention, several URI expressions can be represented by one or more XPath expressions. In an embodiment of the invention, one or more XPath expressions are created and configured at the compile time of the system 300.

The XML document generator 315 receives a URI expression. In an embodiment of the invention, a URI expression is received from one or more of users and auto-generated mechanisms. The URI expression can be a combination of one or more URI expressions. The XML document generator 315 parses the incoming requests and generates XML documents corresponding to the incoming request. The resulting XML document, however, is not serialized to plain text format but instead is an optimized representation of an XML infoset.

The XML document is then received by the XML parser 105. The XML parser 105 reads the optimized representation of the XML infoset and generates SAX events. These SAX events are then supplied to the XPath processor 110, thus enabling the XPath processor to be used on the XML documents. Further, the XPath processor 110 evaluates the XPath expressions on the XML documents. One or more XPath expressions are evaluated simultaneously on the XML document by the XPath processor 110. For evaluating, a match is made between each XPath expression and the XML document by the XPath processor 110 and XPath results are generated. After the XPath results are generated the classification result is outputted by the classification output module 325 to according to the user requirement.

Figure 4:
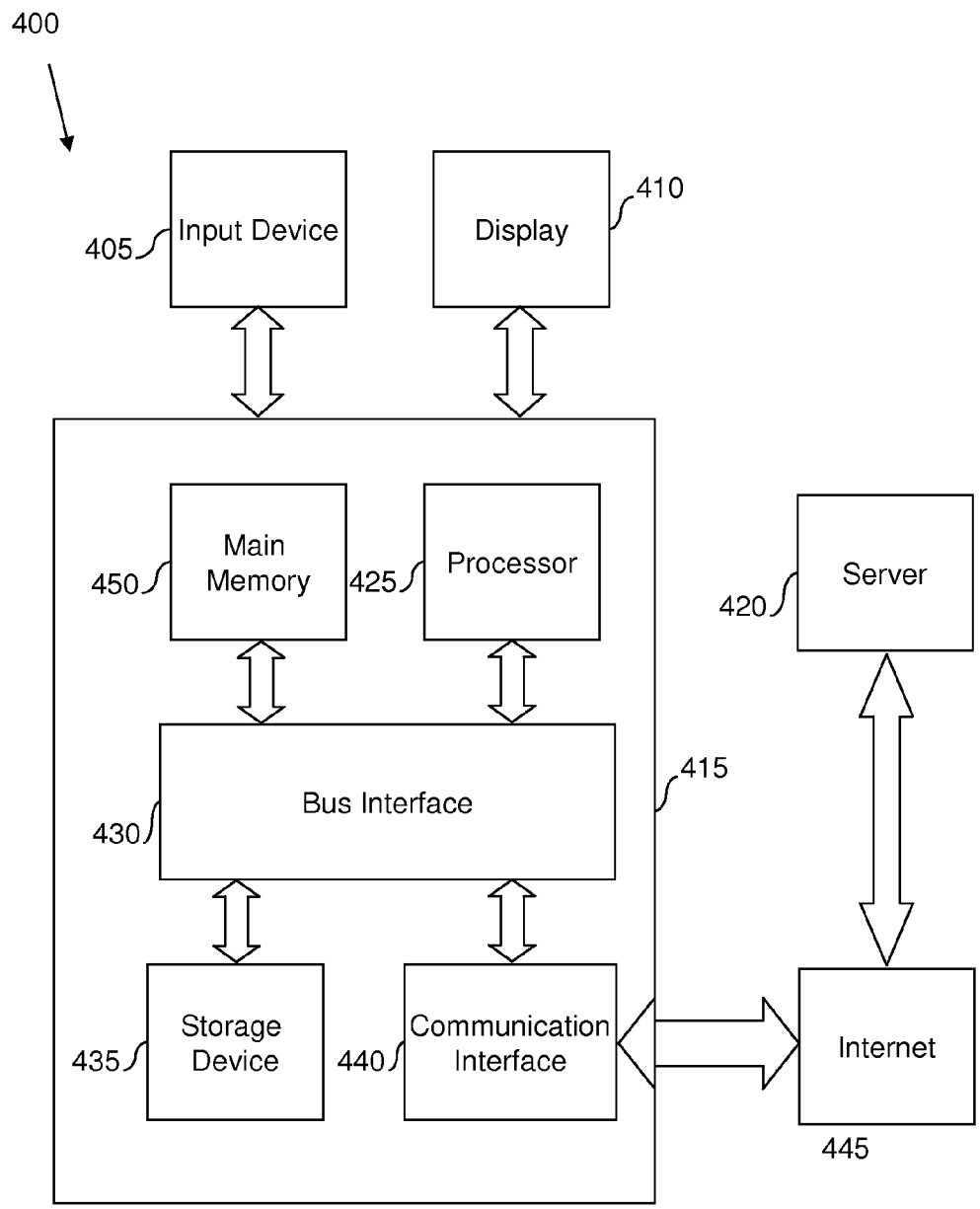
FIG. 4 is a block diagram of an exemplary computer system upon which various embodiments of the invention may be implemented.

FIG. 4 is a block diagram of an exemplary computer system 400 upon which various embodiments of the invention may be implemented. Computer system 400 includes a processing unit 415 including a main memory 450, such as a Random Access Memory (RAM) or other dynamic storage device, coupled to a bus interface 430 for storing information and instructions to be executed by processor 425. A storage device 435, such as a magnetic disk or optical disk, is provided and coupled to bus interface 430 for storing information and instructions. Computer system 400 may be coupled via bus interface 430 to a display 410 for displaying information to a user. An input device 405, including alphanumeric and other keys, is coupled to bus interface 430 for communicating information and command selections to processor 425.

Embodiments of the invention are related to the use of computer system 400 for implementing the techniques described herein. In an embodiment of the invention, those techniques are performed by computer system 400 in response to processor 425 executing one or more sequences of one or more instructions included in main memory 450. Such instructions may be read into main memory 450 from another machine-readable medium product, such as storage device 435. Execution of the sequences of instructions included in main memory 450 causes processor 425 to perform the method embodiment of the invention described herein. In alternative embodiments, hard-wired circuitry may be used in place of or in combination with software instructions to implement the invention. Thus, embodiments of the invention are not limited to any specific combination of hardware circuitry and software.

The term "machine-readable medium product" as used herein refers to any medium that participates in providing data that causes a machine to operation in a specific fashion. Examples of the machine-readable medium product include but are not limited to memory devices, tapes, disks, cassettes, integrated circuits, servers, online software, download links, installation links, and online links.

In an embodiment implemented using computer system 400, various machine-readable medium products are involved, for example, in providing instructions to processor 425 for execution. Computer system 400 also includes a communication interface 440 coupled to bus interface 430. Communication interface 440 provides a two-way data communication coupling to internet 445 that is coupled a server 420. Server 420 might transmit a requested code for an application program through internet 445 and communication interface 440.

Various embodiments of the invention claim that if a URI expression and relevant parameters of the incoming request is converted to an XML document, it is possible to run one or more XPath expressions on the resultant XML document, and these XPath expressions may be used to assign properties to classify the incoming request. This enables the server to retrieve (or generate) the resource for the incoming request in a scalable, flexible and efficient manner. This enables the server to define the classification rules in a flexible and standard language and take actions, such as policy enforcement, access control, collection and aggregation of statistics, based on the classification results. For example, the incoming request may be classified as one amongst but not limited to proper, improper, useful, necessary and urgent. The resource is then served or rejected according to the classification of the incoming request. In other cases, certain policies may be applied to the class of the incoming requests in a given URI space, for example rate limiting of incoming requests.

Various embodiments of the invention take advantage of the structure of URI expression, and hence can match any combination of various components of the incoming request. For example, to ignore a hostname (the first component of a URI expression) and a domain that denotes country of origin (the last or last two parts of the host component of a URI expression), may lead to complications and inefficient pattern matching. Where as using one or more XPath expressions, the result is an efficient and easy to understand syntax, which can match the URI expression.

In an embodiment of the invention, additional information including extra headers from the request can also be included as a part of classification data. In contrast to the prior art methods, URI classification based on such extra information may not be performed as an additional step. Embodiments of the invention can accept additional information as an integral part of classification data and match the URI expression in a single step. Thus, in a single step the incoming request can be classified amongst several categories.

The foregoing description sets forth numerous specific details to convey a thorough understanding of embodiments of the invention. However, it will be apparent to one skilled in the art that embodiments of the invention may be practiced without these specific details. Some well-known features are not described in detail in order to avoid obscuring the invention. Other variations and embodiments are possible in light of above teachings, and it is thus intended that the scope of invention not be limited by this Detailed Description, but only by the following Claims.

What is claimed is:

1. A computer implemented method comprising:
   generating an XML document representation for requests, comprising:
      modeling a request comprising of a uniform resource identifier expression and additional network information as a logical XML document representation; and
      configuring one or more XPath expressions from a schema of the logical XML document representation, each of the one or more XPath expressions representing a classification category for the requests according to the uniform identifier expression and the additional network information;
   classifying an incoming request using the XML document representation, comprising:
      generating an XML document instance, based on the schema of logical XML document representation, from the incoming request; and
      evaluating the one or more XPath expressions of the model on the XML document instance to categorize the incoming request; and
   outputting the classification.

2. The computer implemented method of claim 1, wherein the additional network information comprises one or more of a transport header, transmission control protocol 5-tuple information, and other user supplied information as arbitrary name value pairs.

3. The computer implemented method of claim 1, wherein the incoming request comprises a uniform resource identifier expression.

4. The computer implemented method of claim 1, wherein the incoming request comprises one or more of a uniform resource identifier expression, a uniform resource locator, a uniform resource name, and additional network information.

5. The computer implemented method of claim 1, wherein generating the XML document from the incoming request comprises:
  identifying a uniform resource identifier expression along with additional network information from the incoming request; and
  generating the XML document from the uniform resource identifier expression along with additional network information.

6. The computer implemented method of claim 1, wherein generating the XML document from the incoming request further comprises:
  generating the XML document from the incoming request automatically at runtime.

7. The computer implemented method of claim 1, wherein evaluating the one or more XPath expressions on the XML document comprises:
  creating one or more SAX events by parsing an optimized representation of the XML document; and
  evaluating the one or more XPath expressions on the XML document according to the one or more SAX events.

8. The computer implemented method of claim 1, wherein evaluating further comprises processing the one or more XPath expressions simultaneously on the XML document.

9. A computer implemented system, at least partially implemented in hardware, comprising:
  an XML document model and schema of a request, the request comprising a uniform resource identifier expression and additional network information;
  an XPath expression generator to configure one or more XPath expressions from a schema of the logical XML document representation, each of the one or more XPath expressions representing a classification category for the requests according to the uniform identifier expression and the additional network information;
  an XML document generator to generate an XML document instance from an incoming request, based on the schema of the logical XML document representation; and
  an XPath processor to evaluate the one or more XPath expressions of the model on the XML document to categorize the incoming request.

10. The computer implemented system of claim 9, wherein the incoming request comprises a uniform resource identifier expression.

11. The computer implemented system of claim 9, wherein the XML document generator comprises:
  an identifying module for identifying the uniform resource identifier expression along with additional network information from the incoming request; and
  a generating module for generating the XML document from the uniform resource identifier expression along with additional network information.

12. The computer implemented system of claim 9, wherein the XPath processor evaluates one or more XPath expressions on the XML document simultaneously.

13. A non-transitory machine-readable medium product comprising instructions operable to cause a programmable processor to perform:
  generating an XML document representation for requests, comprising:
    modeling a request comprising of a uniform resource identifier expression and additional network information as a logical XML document representation; and
    configuring one or more XPath expressions from a schema of the logical XML document representation, each of the one or more XPath expressions representing a classification category for the requests according to the uniform identifier expression and the additional network information;
  classifying an incoming request using the XML document representation, comprising:
    generating an XML document instance, based on the schema of logical XML document representation, from the incoming request; and
    evaluating the one or more XPath expressions of the model on the XML document instance to categorize the incoming request; and
  outputting the classification.

14. The non-transitory machine-readable medium product of claim 13, wherein the incoming request comprises a uniform resource identifier.

15. The non-transitory machine-readable medium of claim 13, wherein the incoming request comprises one or more of the uniform resource identifier expression, a uniform resource locator, a uniform resource name, and additional network information.

16. The non-transitory machine-readable medium product of claim 13, wherein generating the XML document from the incoming request comprises:
  identifying a uniform resource identifier expression along with additional network information from the incoming request; and
  generating the XML document from the uniform resource identifier expression along with additional network information.

17. The non-transitory machine-readable medium product of claim 13, wherein generating the XML document from the incoming request further comprises:
  generating the XML document from the incoming request automatically at runtime.

18. The non-transitory machine-readable medium product of claim 13, wherein evaluating the one or more XPath expressions on the XML document comprises:
  creating one or more SAX events by parsing a binary infoset representation of the XML document; and
  evaluating the one or more XPath expressions on the XML document according to the one or more SAX events.

* * * * *